United States Patent
Cattani et al.

(10) Patent No.: US 8,307,646 B2
(45) Date of Patent: Nov. 13, 2012

(54) SYSTEM USING SUPPLEMENTAL COMPRESSOR FOR EGR

(75) Inventors: Luis Carlos Cattani, Aurora, IL (US); Paul Gottemoller, Palos Park, IL (US); Bashar Y. Melhem, Orland Park, IL (US); Martin R. Zielke, Lockport, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 641 days.

(21) Appl. No.: 12/534,977

(22) Filed: Aug. 4, 2009

(65) Prior Publication Data
US 2011/0030371 A1 Feb. 10, 2011

(51) Int. Cl.
F02B 33/44 (2006.01)
F02B 33/00 (2006.01)
F02M 25/07 (2006.01)

(52) U.S. Cl. .......................... 60/605.2; 60/612; 123/562

(58) Field of Classification Search .................. 60/605.2, 60/605.1, 612; 123/562; 415/17, 25, 26, 415/27, 36, 150, 151, 208.3; F02M 25/07
See application file for complete search history.

(56) References Cited

U.S. PATENT DOCUMENTS

| | | | | |
|---|---|---|---|---|
| 4,405,290 A | * | 9/1983 | Rannenberg | 415/27 |
| 5,207,559 A | * | 5/1993 | Clevenger et al. | 415/166 |
| 5,533,487 A | | 7/1996 | Cailey | |
| 5,618,160 A | * | 4/1997 | Harada et al. | 415/17 |
| 5,730,580 A | * | 3/1998 | Japikse | 415/208.3 |
| 5,873,696 A | * | 2/1999 | Harada et al. | 415/150 |
| 5,947,680 A | * | 9/1999 | Harada et al. | 415/17 |
| 6,178,748 B1 | | 1/2001 | Oleksiewicz | |
| 6,205,785 B1 | * | 3/2001 | Coleman | 60/605.2 |
| 6,209,324 B1 | * | 4/2001 | Daudel et al. | 60/605.2 |
| 6,301,888 B1 | * | 10/2001 | Gray, Jr. | 60/605.2 |
| 6,351,946 B1 | * | 3/2002 | Faletti | 60/605.2 |
| 6,401,700 B2 | | 6/2002 | Balekai et al. | |
| 6,418,719 B2 | | 7/2002 | Terry et al. | |
| 6,427,445 B1 | | 8/2002 | Isaac et al. | |
| 6,430,921 B1 | | 8/2002 | Stuart et al. | |
| 6,434,938 B1 | | 8/2002 | Sun et al. | |
| 6,470,682 B2 | * | 10/2002 | Gray, Jr. | 60/605.2 |
| 6,872,050 B2 | * | 3/2005 | Nenstiel | 415/151 |
| 6,973,382 B2 | | 12/2005 | Rodriguez et al. | |
| 6,973,786 B1 | | 12/2005 | Liu et al. | |
| 7,028,680 B2 | | 4/2006 | Liu et al. | |
| 7,032,578 B2 | | 4/2006 | Liu et al. | |
| 7,043,915 B2 | | 5/2006 | Anello | |

(Continued)

FOREIGN PATENT DOCUMENTS
DE 102005048329 A1 * 4/2007
WO WO 2010012919 A1 * 2/2010

Primary Examiner — Thai Ba Trieu
(74) Attorney, Agent, or Firm — Mark C. Bach; Jeffrey P. Calfa

(57) ABSTRACT

A system for driving an EGR stream for an engine includes an exhaust gas turbine, a main compressor and a supplemental EGR compressor. The turbine drives the main compressor to pressurize intake air and drives the supplemental EGR compressor to pressurize an EGR exhaust gas stream to be introduced into the intake air system. A supplemental EGR compressor takes suction of exhaust gas downstream from the turbine. A three-way valve proportions exhaust gas between the engine exhaust gas discharge conduit and the suction of the supplemental EGR compressor. The turbine drives a shaft and the main compressor and the supplemental EGR compressor are driven by having corresponding compressor wheels fixed onto the common shaft.

7 Claims, 1 Drawing Sheet

U.S. PATENT DOCUMENTS

| | | | |
|---|---|---|---|
| 7,047,741 B2 * | 5/2006 | Gray, Jr. | 60/605.2 |
| 7,246,490 B2 * | 7/2007 | Sumser et al. | 60/605.2 |
| 7,257,950 B2 * | 8/2007 | Iwaszkiewicz | 60/605.2 |
| 7,308,788 B1 | 12/2007 | Das | |
| 7,311,090 B2 * | 12/2007 | Lyons | 60/605.2 |
| 7,353,648 B2 | 4/2008 | Zhang | |
| 7,490,462 B2 * | 2/2009 | Roozenboom et al. | 60/605.2 |
| 7,565,237 B2 * | 7/2009 | Wang | 701/103 |
| 2005/0257521 A1 | 11/2005 | Anello | |
| 2008/0078176 A1 | 4/2008 | de Ojeda | |

\* cited by examiner

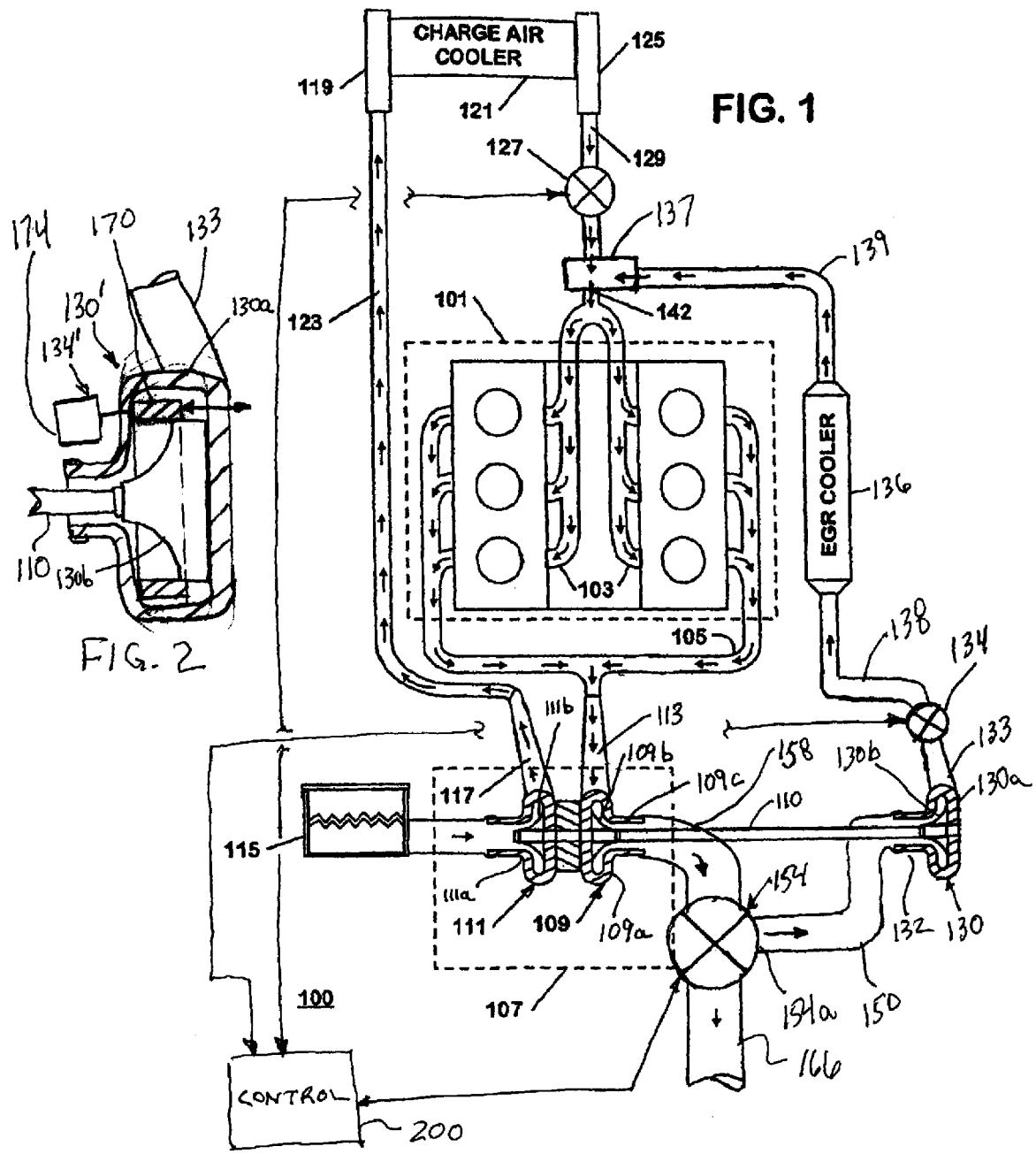

SYSTEM USING SUPPLEMENTAL COMPRESSOR FOR EGR

FIELD OF THE INVENTION

This invention relates to internal combustion engines, particularly a truck diesel engine that has exhaust gas recirculation.

BACKGROUND OF THE INVENTION

Diesel engines are powerplants used on many trucks that are presently being manufactured in North America.

Typically, diesel engines are equipped with single or two-stage turbochargers. A two-stage turbocharger comprises high- and low-pressure turbines in series flow relationship in the exhaust system that operate high- and low-pressure compressors in series flow relationship in the intake system to develop boost is one example of a turbocharger. A single-stage stage turbocharger has only a single turbine and a single compressor.

Diesel engine combustion must be precisely controlled to minimize emissions. Among the factors in determining emission levels is the presence of excess oxygen in the combustion process. Exhaust gas recirculation (EGR) is the process of re-circulating a portion of an engine's exhaust back into the engine's cylinders, and it has been used to reduce peak combustion temperatures, lower excess oxygen levels, and reduce NOx emissions.

Increasingly stringent emission regulations require increasing EGR flow rates to avoid the use of expensive after treatment technologies.

U.S. published patent application 2008/0078176 and U.S. Pat. No. 6,973,786 describe engine control systems for turbocharged diesel engines. These documents describe strategies for control of turbochargers and EGR valves.

There are different known methods to "drive" EGR, that is, to ensure that sufficient EGR flow rate is maintained with respect to the fresh air flow rate into the intake manifold. Because EGR gas flow must be driven through the EGR cooler and conduits, pressure drops can reduce the maximum flow rate of EGR gas given the pressure available in the exhaust manifold. Some methods used alone or in combination are:

a. Use of the air intake throttle valve; restricting intake air using the throttle can be used to drive EGR; however, at the expense of higher fuel consumption.

b. Use of cold side EGR valve (i.e., pneumatic, hydraulic, electrical) or a check valve, such as a Reed valve. These types of valves used at the EGR gas outlet port let the EGR gases flow into the EGR/air mixer and prevent the charged air boost pressure (when higher than the EGR pressure) from reversing the EGR flow.

c. Use of pulsating exhaust manifolds. Exhaust gases pressure varies with a sinusoidal form (pulses with peaks and outlet). When the exhaust gas pressure is at the peak of the pulse (highest value) it is used to overcome the charge air boost pressure, thus creating the mix of fresh charged air with EGR gases. In order to be able to use the pulses of each cylinder, exhaust manifolds are designed in a manner that allow the connection of exhaust runners with pressure waves that are in phase. This type of design commonly called "split manifolds" are used in combination with split EGR hot side tubes (from exhaust manifolds to EGR), split bundles in the EGR cooler core and split EGR cold tubes (from EGR to the EGR/air mixer).

The present inventors recognize that it would be desirable to provide an EGR driving system that is economical to manufacture, and effective and reliable in operation.

SUMMARY OF THE INVENTION

The exemplary embodiments of the invention provide a system, apparatus and method for providing an EGR stream for an engine. Particularly, the method of driving an EGR gas flow rate from an engine exhaust to an engine air intake, includes the steps of:

arranging a turbocharger on an engine, the turbocharger having an exhaust gas turbine that mechanically drives a main compressor;

directing a first exhaust gas flow rate into the gas turbine to drive the exhaust gas turbine which drives the main compressor;

using the main compressor, compressing air and directing compressed air into engine air intake;

arranging a supplemental compressor to be driven by the gas turbine; directing a second exhaust gas flow rate into the supplemental compressor, compressing the second exhaust gas flow rate;

directing compressed second exhaust gas flow rate into the engine air intake.

According to one aspect of the method, the first exhaust gas flow rate can be a sum of the second exhaust gas flow rate and a third exhaust gas flow rate, wherein the third excess gas flow rate is discharged through the exhaust gas discharge.

The method can also include the steps of controlling the proportion of the second and third flow rates.

The method can also provide the step of selectively closing the supplemental compressor to exhaust gas flow.

The exemplary embodiments of the invention provide an EGR system and/or a turbocharger system for an engine, the engine having an intake air manifold, an exhaust manifold, the exhaust gas manifold directing exhaust gas into the turbocharger and the turbocharger directing compressed air into the intake air manifold.

The system includes an exhaust gas turbine having a turbine housing and a turbine wheel within the turbine housing fixedly mounted on a shaft, the turbine housing having an inlet in fluid communication with the exhaust gas manifold and an outlet in fluid communication with an exhaust gas discharge conduit.

The system includes a main intake air compressor having a main compressor housing and a main compressor wheel within the main compressor housing fixedly mounted on the shaft, the main compressor housing having an inlet in fluid communication with intake air and an outlet in fluid communication with the intake air manifold.

The system includes a supplemental compressor having a supplemental compressor housing and a supplemental compressor wheel within the supplemental compressor housing fixedly mounted on the shaft, the supplemental compressor housing having an inlet in fluid communication with the exhaust gas manifold and an outlet in fluid communication with the intake air manifold.

The turbine wheel is configured to be rotated by exhaust gas flow through the turbine housing. Rotation of the turbine wheel rotates the shaft and thereby rotates the main compressor wheel and the supplemental compressor wheel. Rotation of the main compressor wheel compresses intake air and delivers compressed intake air to the intake air manifold. Rotation of the supplemental compressor wheel compresses exhaust gas and delivers compressed exhaust gas to the intake air manifold.

The turbine wheel can be arranged along the shaft between the main compressor wheel and the supplemental compressor wheel.

The system can include a valve in fluid communication between the exhaust gas turbine housing outlet and the supplemental compressor housing inlet. The valve can be controllable to proportion the flow rate of exhaust gas compressed by the supplemental compressor and the flow rate of exhaust gas to the exhaust gas discharge conduit.

The system can include a throttle valve for at least partially closing the supplemental compressor housing outlet to exhaust gas flow. The supplemental compressor wheel can be a centrifugal compressor wheel and the throttle valve can be a circular cylindrical sleeve movable to selectively cover or expose outlets between vanes of the centrifugal compressor wheel.

The system can include an EGR cooler arranged in fluid communication between the supplemental compressor housing outlet and the intake air manifold. The system can include an EGR/air mixer arranged in fluid communication between the EGR cooler and the intake air manifold.

Numerous other advantages and features of the present invention will become readily apparent from the following detailed description of the invention and the embodiments thereof, from the claims, and from the accompanying drawings.

BRIEF DESCRIPTION OF THE DRAWINGS

FIG. 1 is a general schematic diagram of an engine system including a supplemental EGR compressor; and FIG. 2 is an enlarged schematic diagram of an alternate throttle valve arrangement on the supplemental EGR compressor.

DETAILED DESCRIPTION OF THE PREFERRED EMBODIMENT

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

The following describes an apparatus for and method of augmenting flow of exhaust gas from an exhaust system of a turbocharged diesel engine into an EGR cooler. The diesel engine may have an intake throttle device, and may additionally have one or more turbochargers.

A typical diesel engine 100 is shown in FIG. 1. The engine 100 has a crankcase 101 that includes a plurality of cylinders in the crankcase 101 that are fluidly connected to an intake system 103 and to an exhaust system 105. A turbocharger 107 includes a turbine 109 having a turbine inlet 113 connected to the exhaust system 105 and driving a main intake air compressor 111 connected to the intake system 103. The turbine 109 includes a turbine housing 109a and a turbine wheel 109b within the housing 109b and fixedly mounted to a shaft 110. The main compressor 111 includes a main compressor housing 111a and a main compressor wheel 111b within the housing and also fixedly mounted to the shaft 110. An air cleaner 115 is connected to an inlet of the main compressor 111. An outlet 117 of the main compressor 111 is connected to an inlet 119 of a charge air cooler 121 through a hot air passage 123. An outlet 125 of the charge air cooler 121 is connected to an intake throttle 127 through a cold air passage 129.

A supplemental EGR compressor 130 includes a supplemental compressor housing 130a and a supplemental compressor wheel within the housing 130a and also fixedly mounted to the shaft 110. The supplemental EGR compressor includes an inlet 132 and an outlet 133. The outlet 133 is fluidly connected to an EGR throttle valve 134. The valve 134 is fluidly connected to an EGR cooler 136 via a first conduit 138. The term "conduit" throughout this application should be understood to include tubes, pipes, passages or any type of channel for directing fluid such as a gas or liquid. The term "shaft" also encompasses an assembly made up of separate shaft pieces and coupled or attached together. The EGR cooler 136 is fluidly connected to an EGR/intake air mixer 137 via a second conduit 139. Such mixers are described in U.S. Pat. Nos. 7,028,680 and 7,032,578, herein incorporated by reference. An outlet 142 of the mixer 137 is connected to the intake system or intake manifold 103.

The inlet 132 of the supplemental EGR compressor 130 is connected to an inlet conduit 150 that is connected to an outlet 154a of a three-way valve 154. The valve 154 has an inlet 154b connected to a turbine outlet 109c via a turbine outlet conduit 158. The shaft 110 sealingly penetrates through walls of the conduits 150, 158.

During normal engine operation, cooled compressed intake air enters the mixer 137 through the valve 127. Depending on the position of the three way valve 154, EGR exhaust gas is drawn into the inlet 132 of the supplemental EGR compressor 130 via the conduit 150. The supplemental compressor throttle valve 134 would be open and EGR gas would pass through the first conduit 138, the cooler 136, the second conduit 139 and into the mixer 137. The cooled, compressed intake air mixes with EGR exhaust gas in the mixer 137. A mixture of exhaust gas and air exits the mixer 137 from the outlet 142 and enters the intake system 103.

When the engine 100 operates at or near an idle condition, i.e., when engine speed is low and there is little to no torque load on the engine, the intake throttle 127 may be almost completely closed while the throttle valve 134 may be open to allow a flow of exhaust gas from the supplemental compressor 130 to pass through the EGR cooler 136, and enter the mixer 137. The mixture of air and exhaust gas exiting the mixer 137 must be adequate to maintain a stable idle engine speed of the engine 100.

When the engine 100 operates above an idle condition, the intake throttle 127 may be substantially, or more than 5%, open. Cooled intake air exiting the charge air cooler 121 enters the mixer 137 and mixes with exhaust gas coming from the supplemental compressor 130. The mixture of air and exhaust gas exits the mixer 137 and enters the intake system 103 of the engine 100.

The valve 134 opens when EGR flow is needed and closes when EGR flow is not needed to protect against turbo surge/choking when EGR flow rates are low.

The three way valve 154 is positioned to select the quantity of EGR gas needed for the operating conditions. The remaining exhaust gas passing through the valve 154 is directed into an exhaust discharge conduit 166. This gas is typically treated before release to the atmosphere.

FIG. 2 illustrates an alternate embodiment throttle valve 134' used on an alternate supplemental compressor 130'. Instead of a throttle valve located in the outlet 133, a throttle sleeve 170 can be arranged within the housing 130a of an alternate supplemental compressor 130'. The throttle sleeve 170, in the form of a circular cylindrical ring, is positionable by an actuator 174 to block or expose to varying degrees, flow passages between vanes of a centrifugal type compressor wheel 130b. In this regard, the actuator moves the sleeve in an axial direction of the shaft 110. The actuator can be a pneumatic actuator, an electric actuator such as a solenoid, or other type actuator.

The throttle sleeve 170 opens when EGR flow is needed and closes when EGR flow is not needed to protect against turbo surge/choking when EGR flow rates are low.

A system control 200 receives feedback on valve position for the valves 127, 134, or 134', and 154. The control strategies for positioning the valves can be embodied in one or more processors of an engine control system as algorithms for processing data, such as described in U.S. published application 2008/0078176, herein incorporated by reference. The turbocharger and/or the basic EGR control strategy could alternately be as described in U.S. Pat. Nos. 7,353,648; 6,973,382 or 6,401,700 all herein incorporated by reference.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. An EGR system for an engine, the engine having an intake air manifold, an exhaust manifold, a turbocharger with an exhaust gas turbine that drives an intake air compressor, the exhaust gas manifold directing exhaust gas into the exhaust gas turbine and the intake air compressor directing compressed air into the intake air manifold, comprising:
    a supplemental compressor mechanically connected to the exhaust gas turbine to be driven by the exhaust gas turbine, the supplemental compressor having a supplemental compressor inlet for receiving a portion of the exhaust gas flow rate from an outlet of the exhaust gas turbine, the supplemental compressor compressing the portion of the exhaust gas flow rate;
    a control valve in fluid communication between the outlet of the exhaust gas turbine and the supplemental compressor inlet for controlling the portion of the exhaust gas flow rate into the supplemental compressor;
    the supplemental compressor having a supplemental compressor wheel for compressing the portion of the exhaust gas flow rate;
    a throttle valve located downstream of the supplemental compressor wheel to control the portion of the exhaust gas flow rate; and
    a path between the throttle valve and the intake air manifold, wherein the supplemental compressor wheel comprises a centrifugal compressor wheel and the throttle valve comprises a circular cylindrical sleeve movable to selectively cover or expose outlets between vanes of the centrifugal compressor wheel.

2. The EGR system according to claim 1, further comprising an EGR cooler arranged in the path in fluid communication between the throttle valve and the intake air manifold.

3. The EGR system according to claim 2, further comprising an EGR/air mixer arranged in fluid communication between the EGR cooler and the intake air manifold.

4. A turbocharger system for an engine, the engine having an intake air manifold, an exhaust manifold, the exhaust gas manifold directing exhaust gas into the turbocharger and the turbocharger directing compressed air into the intake air manifold, comprising:
    an exhaust gas turbine having a turbine housing and a turbine wheel within the turbine housing fixedly mounted on a shaft, the turbine housing having an inlet in fluid communication with the exhaust gas manifold and an outlet in fluid communication with an exhaust gas discharge conduit;
    a main intake air compressor having a main compressor housing and a main compressor wheel within the main compressor housing fixedly mounted on the shaft, the main compressor housing having an inlet in fluid communication with intake air and an outlet in fluid communication with the intake air manifold;
    a supplemental compressor having a supplemental compressor housing and a supplemental compressor wheel within the supplemental compressor housing fixedly mounted on the shaft, the supplemental compressor housing having an inlet in fluid communication with the exhaust gas turbine housing outlet and an outlet in fluid communication with the intake air manifold;
    a control valve in fluid communication between the exhaust gas turbine housing outlet and the supplemental compressor housing inlet, the valve controllable to proportion the flow rate of exhaust gas compressed by the supplemental compressor and the flow rate of exhaust gas to the exhaust gas discharge conduit;
    the turbine wheel configured to be rotated by exhaust gas flow through the turbine housing, rotation of the turbine wheel rotates the shaft and thereby rotates the main compressor wheel and the supplemental compressor wheel, rotation of the main compressor wheel compresses intake air and delivers compressed intake air to the intake air manifold, rotation of the supplemental compressor wheel compresses exhaust gas and delivers compressed exhaust gas to the intake air manifold;
    a throttle valve located downstream of the supplemental compressor wheel to control the flow rate of the compressed exhaust gas; and
    a path between the throttle valve and the intake air manifold, wherein the supplemental compressor wheel comprises a centrifugal compressor wheel and the throttle valve comprises a circular cylindrical sleeve movable to selectively cover or expose outlets between vanes of the centrifugal compressor wheel.

5. The turbocharger system according to claim 4, wherein the turbine wheel is arranged along the shaft between the main compressor wheel and the supplemental compressor wheel.

6. The turbocharger system according to claim 4, further comprising an EGR cooler arranged in the path in fluid communication between the throttle valve and the intake air manifold.

7. The turbocharger system according to claim 6, further comprising an EGR/air mixer arranged in fluid communication between the EGR cooler and the intake air manifold.

* * * * *